(12) United States Patent
Bambini (10) Patent No.: US 9,730,042 B2
(45) Date of Patent: Aug. 8, 2017

(54) AIRCRAFT DATA HANDOFF

(71) Applicant: GE Aviation Systems LLC, Grand Rapids, MI (US)

(72) Inventor: John Silvio Bambini, Kentwood, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/975,974

(22) Filed: Dec. 21, 2015

(65) Prior Publication Data

US 2017/0180962 A1   Jun. 22, 2017

(51) Int. Cl.
| | |
|---|---|
| *H04W 4/02* | (2009.01) |
| *H04W 4/22* | (2009.01) |
| *H04W 4/00* | (2009.01) |
| *H04W 4/04* | (2009.01) |
| *H04B 7/185* | (2006.01) |
| *H04W 72/04* | (2009.01) |
| *H04W 64/00* | (2009.01) |

(52) U.S. Cl.
CPC .......... *H04W 4/22* (2013.01); *H04B 7/18506* (2013.01); *H04W 4/025* (2013.01); *H04W 64/006* (2013.01); *H04W 72/048* (2013.01)

(58) Field of Classification Search
CPC ..... H04W 4/22; H04W 64/006; H04W 4/025; H04W 72/048; H04B 7/18506; B64D 45/00; G08G 5/0008; G07C 5/008; G06G 7/76

USPC ... 455/431, 98, 404.1, 404.2, 508, 521, 527, 455/441; 340/961, 945, 313, 973, 981, 340/539.18, 691.3, 7.48
See application file for complete search history.

(56) References Cited

U.S. PATENT DOCUMENTS

| | | |
|---|---|---|
| 7,085,562 B1 | 8/2006 | Holder et al. |
| 8,121,593 B2 | 2/2012 | Pandit et al. |
| 2001/0047229 A1 | 11/2001 | Staggs |
| 2008/0117858 A1 | 5/2008 | Kauffman |
| 2009/0092074 A1 | 4/2009 | Jamalipour et al. |
| 2009/0134981 A1* | 5/2009 | Shafaat ............... G08G 5/0008 340/313 |

(Continued)

OTHER PUBLICATIONS

European Search Report and Opinion issued in connection with corresponding EP Application No. 6203698.2 dated May 10, 2017.

*Primary Examiner* — Inder Mehra
(74) *Attorney, Agent, or Firm* — GE Global Patent Operation; William S. Munnerlyn (57) ABSTRACT

Systems and methods for collecting aircraft data from aircrafts within proximity of one another while in-flight are provided. In one embodiment, the method can include receiving, by a first aircraft, a first transmission from a second aircraft. The first transmission can include first data associated with the second aircraft. The method can include determining a communication time period based, at least in part, on the first data. The method can include sending, to the second aircraft, a second transmission that can include second data indicative of at least the communication time period. The method can include receiving, from the second aircraft, one or more third transmissions that can include third data indicative of one or more parameters of the second aircraft. A size of the third data can be based, at least in part, on the communication time period.

18 Claims, 5 Drawing Sheets

(56) References Cited

U.S. PATENT DOCUMENTS

| | | | | |
|---|---|---|---|---|
| 2010/0109912 A1* | 5/2010 | Stokes | ............... | B64D 45/0015 |
| | | | | 340/945 |
| 2013/0242864 A1 | 9/2013 | Vermande et al. | | |
| 2013/0317673 A1* | 11/2013 | Leroy | ................ | H04B 7/18506 |
| | | | | 701/14 |
| 2017/0003690 A1* | 1/2017 | Tanahashi | ............ | G05D 1/0011 |

* cited by examiner

| TAIL NUMBER | AIRCRAFT HEADING | AIRCRAFT SPEED | FLIGHT NUMBER | AIRCRAFT ALTITUDE | AIRCRAFT VELOCITY | AIRCRAFT LOCATION |

| TAIL NUMBER | FLIGHT NUMBER | AIRCRAFT TYPE | FLIGHT TIME TICK | THIRD SET OF DATA |

AIRCRAFT DATA HANDOFF

FIELD OF THE INVENTION

The present subject matter relates generally to collecting aircraft data and more particularly to collecting aircraft data while in-flight.

BACKGROUND OF THE INVENTION

Modern aircrafts typically employ an onboard data acquisition system for collecting digital flight data. In such systems, a number of sensors distributed throughout the aircraft provide data signals representative of the performance of the aircraft and its one or more engine(s). This flight data is stored in an attendant, physically robust flight data recorder (commonly referred to as the "black box"), so that in the unlikely event of an in-flight mishap, the flight data recorder can be removed and the stored flight performance data can be analyzed to determine the cause of the mishap.

In the unlikely event of a catastrophic aircraft failure, it is possible that the aircraft and the flight data recorder are never recovered. Even if the flight data recorder is recovered it may be damaged, thereby reducing the reliability of the stored flight performance data. In such a case, it may become impossible or difficult to determine the cause of the aircraft failure. Moreover, inability to examine the stored flight data can hinder the ability to predict and prevent similar problems in the future.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of collecting aircraft data. The method can include receiving, by one or more computing devices located on a first aircraft, a first transmission from a second aircraft. The first transmission can include a first set of data associated with the second aircraft. The method can further include determining, by the one or more computing devices, a communication time period during which the first aircraft can receive data sent from the second aircraft. The communication time period can be determined based at least in part on the first set of data. The method can include sending, by the one or more computing devices, a second transmission to the second aircraft. The second transmission can include a second set of data indicative of at least the communication time period. The method can further include receiving, by the one or more computing devices, one or more third transmissions from the second aircraft. The one or more third transmissions can include a third set of data indicative of one or more parameters associated with the second aircraft. A size of the third set of data can be based at least in part on the communication time period.

Another example aspect of the present disclosure is directed to an avionics system for collecting aircraft data. The avionics system can include one or more processors and one or more memory devices included with a first aircraft. The one or more memory devices can store instructions that when executed by the one or more processors cause the one or more processors to perform operations. The operations can include receiving a first transmission from a second aircraft. The first transmission can include a first set of data associated with the second aircraft. The operations can further include receiving one or more second transmissions from the second aircraft. The second transmissions can include a second set of data indicative of one or more parameters associated with the second aircraft. A size of the second set of data can be based at least in part on a communication time period during which the first aircraft is able to receive the one or more second transmissions from the second aircraft. The communication time period can be based at least in part on the first set of data.

Yet another example aspect of the present disclosure is directed to an aircraft. The aircraft can include an engine, a fuselage, and a computing system. The computing system can include one or more processors and one or more memory devices located on the aircraft. The one or more memory devices can store instructions that when executed by the one or more processors cause the one or more processors to perform operations. The operations can include receiving, from another aircraft, a first transmission including a first set of data associated with a velocity and a location of the other aircraft. The operations can further include receiving, from the other aircraft, one or more second transmissions including a second set of data indicative of one or more parameters associated with the other aircraft. A size of the second set of data can be based at least in part on a communication time period indicative of a time period during which the aircraft can receive the one or more second transmissions from the other aircraft. The communication time period can be based at least in part on the first set of data of the first transmission.

Other example aspects of the present disclosure are directed to systems, methods, aircraft, avionics systems, devices, non-transitory computer-readable media for collecting aircraft data.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more example(s) of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for collecting aircraft data. For instance, two aircrafts can be in radio transmission of one another while in-flight. The aircrafts can determine a communication time period during which the aircrafts can send and/or receive data to one another. One of the aircrafts can send data indicative of one or more parameter(s) associated with the aircraft (e.g., data stored in the data flight recorder of the second aircraft). The size of the parameter data can be based on the communication time period so that maximal set of parameter data can be received by the other aircraft. The receiving aircraft can store the parameter data and, upon landing, send it to one or more remote computing device(s) configured to compile aircraft data. In the event an aircraft (and/or its flight data recorder) is not recovered, the remote computing devices will have at least some data associated with the aircraft.

More particularly, to initiate the data collection process a first aircraft can receive, from a second aircraft, a first transmission including a first set of data. For example, the first set of data can include a heading of the second aircraft, a speed of the second aircraft, a flight number associated with the second aircraft, and/or an altitude of the second aircraft. In some implementations, the first set of data can include an indication of a distress signal associated with the second aircraft (e.g., reporting a threat of danger).

In the event that the first data set includes an indication of a distress signal, the first aircraft can alert its flight crew members of the distress signal. For instance, the first aircraft can activate a visual and/or audio alert on a display system and/or an alert system of the first aircraft. Additionally and/or alternatively, the first aircraft can send the distress signal to a control tower that can help to address the problems of the second aircraft.

The first aircraft can also, and/or alternatively, determine a communication time period during which the first aircraft can receive data sent from the second aircraft. For instance, the communication time period can be based, at least in part, on the first set of data. In particular, the communication time period can be based, at least in part, on a velocity associated with the first aircraft, a velocity associated with the second aircraft, and a distance between the first and second aircrafts. The first aircraft can send a second transmission to the second aircraft, including a second set of data that is indicative of the communication time period.

The second aircraft can receive the second transmission and generate a third set of data based, at least in part, on the communication time period. For instance, the third set of data be indicative of data recorded in a flight recorder of the second aircraft and/or one or more operating parameter(s) associated with the second aircraft. The size of the third set of data can be based, at least in part, on the communication time period. As used herein, the term size when used in reference to a set of data refers to the number of bytes, bits, nibbles, and/or words associated with the third set of data, the amount of data packets included in the data set, and/or any other indicator of the number of or amount of data included in a set and/or series of data.

For example, the second aircraft can determine how much data the second aircraft can send and the first aircraft can receive within the communication time period. In some implementations, the second aircraft can multiply the communication time period by a data speed associated with the communication network. In this way, the third data set can be received by the first aircraft in its entirety. The second aircraft can send one or more third transmission(s) to the first aircraft, including the third set of data.

The first aircraft can receive the one or more third transmission(s) and can store the third transmission(s) in an onboard memory and/or database. The first aircraft can then send the third data set to one or more remote computing device(s) (e.g., of a ground-based computing system).

The one or more remote computing device(s) can be configured to compile data associated with the second aircraft. For instance, the third set of data can include one or more data fragment(s). The remote computing device(s) can be configured to compile the data fragments to create a compiled set of data associated with the second aircraft.

The systems and methods according to example aspects of the present disclosure can collect aircraft data from an aircraft, without having to directly communicate with that aircraft and/or recover its flight data recorder. More particularly, the systems and methods can allow aircrafts to more reliably transfer data by generating and sending data sets based on communication time periods. For instance, if the size of a data set is too large, it can take longer than the allotted timeframe to successfully transfer the data. As a result, only portions or none of the data will be received. However, the systems and methods according to example aspects of the present disclosure can tailor the size of the data sets (e.g., based on a communication time period) such that the maximal or entire set of data can be delivered to another aircraft and, ultimately, a ground-based system. In this way, the systems and methods according to example aspects of the present disclosure have a technical effect of indirectly collecting aircraft data in a more reliable manner, increasing the ability to gather data associated with unrecovered or damaged aircrafts.

Figure 1:
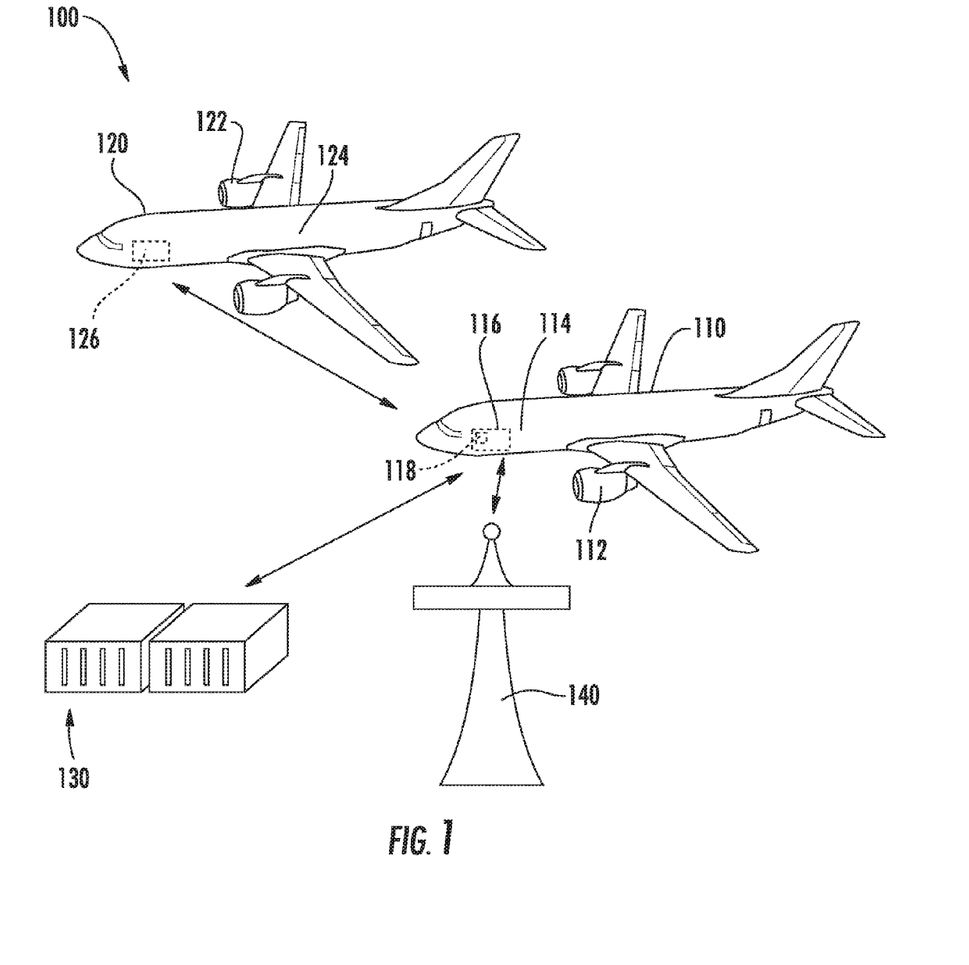
FIG. 1 depicts an example system for collecting aircraft data according to example embodiments of the present disclosure.

With reference now to the FIGS., example embodiments of the present disclosure will be discussed in further detail. FIG. 1 depicts an example system 100 for collecting aircraft data according to example embodiments of the present disclosure. The system 100 can include one or more of a first aircraft 110, a second aircraft 120, one or more remote computing device(s) 130, and one or more control tower(s) 140. The first aircraft 110, the second aircraft 120, the one or more remote computing device(s) 130, and the one or more control tower(s) 140 can be configured to communicate among one another via a very high frequency (VHF) network, high frequency (HF) network, SATCOM network, WiFi network, and/or any other suitable communication networks or links.

The first aircraft 110 can include an engine 112, a fuselage 114, and a first onboard computing system 116 that is located on the first aircraft 110. In some implementations, the engine 112 can be configured as a gas turbine engine. For example, the engine 112 can include a compressor section, a combustion section, and a turbine section in serial flow order. The engine 112 can be configured as a turbofan engine, a turbojet engine, a turboprop engine, a turboshaft engine, etc. In other implementations, the engine 112 can be an internal combustion engine, or any other suitable engine for use in an aircraft.

The first onboard computing system 116 can include one or more computing device(s) 118 that can, for instance, be associated with an avionics system. The computing device(s) 118 can be coupled to a variety of systems on the first aircraft 110 over a communications network (e.g., a data bus, wired and/or wireless communication links, combination thereof, etc.). For instance, the computing device(s) 118 can be configured to be in communication with an onboard database or memory configured to store data. For example, the computing device(s) 118 can be configured to be in communication with a flight data recorder associated with aircraft 110.

The computing device(s) 118 can be configured to be in communication with a display system including one or more display device(s) that can be configured to display or otherwise provide information generated and/or received by the computing device(s) 118 to one or more flight crew member(s) of the first aircraft 110. The display system can include a primary flight display, a multipurpose control display unit, or other suitable flight display commonly included within a cockpit of the aircraft.

Additionally and/or alternatively, the computing device(s) 118 can be configured to be in communication with one or more alert system(s) of the first aircraft 110. For instance, the computing device(s) 118 can be configured to be in communication with an audio and/or visual alert system that is configured to notify one or more flight crew member(s).

The computing device(s) 118 can be configured to be in communication with one or more other device(s) or system(s) that are not located on aircraft 110. For example, the computing device(s) 118 can be configured to receive one or more transmission(s) including one or more set(s) of data from the second aircraft 120. The computing device(s) 118 can be configured to store one or more set(s) of data received from the second aircraft 120. Additionally and/or alternatively, the computing device(s) 118 can be configured to send one or more set(s) of data to the second aircraft 120, the remote computing device(s) 130, and/or the control tower(s) 140. Moreover, the computing device(s) 118 can be configured to send and/or receive data while the first aircraft 110 (and/or the second aircraft 120) is in-flight.

The computing device(s) 118 can also be configured to determine a communication time period during which the first aircraft 110 is able to receive data from the second aircraft 120. In some implementations, the communication time period can be determined based, at least in part, on data received from the second aircraft 120, as further described herein.

The second aircraft 120 can include an engine 122, a fuselage 124, and a second onboard computing system 126 that is located on the second aircraft 110. In a similar manner to the engine 112, in some implementations, the engine 122 can be configured as a gas turbine engine. For example, the engine 122 can include a compressor section, a combustion section, and a turbine section in serial flow order. The engine 122 can be configured as a turbofan engine, a turbojet engine, a turboprop engine, a turboshaft engine, etc. In other implementations, the engine 122 can be an internal combustion engine, or any other suitable engine for use in an aircraft.

The second onboard computing system 126 can include one or more computing device(s) that can, for instance, be associated with an avionics system. The second onboard computing system 126 can be coupled to a variety of systems on the second aircraft 120 over a communications network (e.g., a data bus, wired and/or wireless communication links, combination thereof, etc.). For instance, the second onboard computing system 126 can be configured to be in communication with an onboard database or memory configured to store data. For example, the second onboard computing system 126 can be configured to be in communication with a flight data recorder of the second aircraft 120 to access and/or obtain the data associated therewith.

The second onboard computing system 126 can also be in communication with various aircraft systems, such as aircraft systems associated with one or more engine(s) 122 and other components of the second aircraft 120. The aircraft systems can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, and other systems. The aircraft systems can provide various operating parameters to the second onboard computing system 126.

The second aircraft 120 and the first aircraft 110 can be configured to communicate by sending one or more transmission(s) including one or more set(s) of data. For example, second aircraft 120 can be configured to send and/or receive one or more transmission(s) to and/or from the first aircraft 110. The first aircraft 110 can be configured to send and/or receive one or more transmission(s) to and/or from the second aircraft 120. For instance, the second onboard computing system 126 can be configured to send one or more transmission(s) (including one or more set(s) of data) to the computing device(s) 118 of the first aircraft 110. The computing device(s) 118 can be configured to receive the one or more transmission(s) (including the set(s) of data).

For example, the second onboard computing system 126 can be configured to send an initial transmission to the computing device(s) 118. The initial transmission can include a first set of data associated with the second aircraft 120. The first set of data can include, for instance, at least one of a heading of the second aircraft 120, a speed of the second aircraft 120, a velocity of the second aircraft 120, a location of the second aircraft 120, a flight number associated with the second aircraft 120, or an altitude of the second aircraft 120. Additionally and/or alternatively, the first set of data can include an indication of a distress signal associated with the second aircraft 120.

The computing device(s) 118 can be configured to receive the initial transmissions. As indicated above, in some implementations, computing device(s) 118 can be configured to determine a communication time period based, at least in part, on the first set of data. The communication time period can be indicative of a time period during which the first aircraft 110 can receive one or more transmissions from the second aircraft 120. For example, the communication time period can be a timeframe or period of time (e.g., measured in units of time) during which the second aircraft 120 is able to send data to the first aircraft 110 and the first aircraft 110 is able to receive data from the second aircraft 120. The computing device(s) 118 can be configured to send a set of data indicative of the communication time period to the second aircraft 120.

In other implementations, the second aircraft 120 can be configured to determine the communication time period. For instance, in response to the initial transmission, the computing device(s) 118 can send a transmission to the second onboard computing system 126 including a set of data that is associated with the first aircraft 110. The set of data can include, for example, a heading of the first aircraft 110, a speed of the first aircraft 110, a velocity of the first aircraft 110, a location of the first aircraft 110, a flight number associated with the first aircraft 110, or an altitude of the first aircraft 110. The second onboard computing system 126 can determine the communication time period based, at least in part, on that set of data.

The second onboard computing system 126 can be configured to send, to the computing device(s) 118, one or more transmission(s) including a set of data indicative of one or more parameter(s) associated with the second aircraft 120. For example, the set of data can be the same as or similar to data recorded in the flight data recorder of the aircraft 120. Additionally and/or alternatively, the set of data can be indicative of one or more operating parameter(s) provided to the second onboard computing system 126 by the aircraft systems of the second aircraft 120. In some implementations, the size of the set of data can be based, at least in part, on the communication time period, as further described herein.

The computing system(s) 118 can be configured to receive the one or more transmission(s) (including the set of data indicative of one or more parameter(s) associated with the second aircraft 120). The computing device(s) 118 can be configured to send the set of parameter data to the one or more computing device(s) 130.

The one or more remote computing device(s) 130 can include, for instance, one or more server device(s) that are configured to receive one or more transmission(s) and/or data from one or more other device(s). In some implementations, the remote computing device(s) 130 can be ground-based computing device(s). For instance, the one or more remote computing device(s) 130 can be configured to receive (from the computing device(s) 118) one or more transmission(s) including the set of data indicative of one or more parameter(s) associated with the second aircraft 120.

Moreover, the one or more remote computing device(s) can be configured to compile the data associated with an aircraft. For instance, in the event that the one or more remote computing device(s) 130 receives data associated with the second aircraft 120, the one or more remote computing device(s) 130 can be configured to compile the data associated with the second aircraft 120 to create a compiled data set.

In the event that the computing device(s) 118 receive an indication of a distress signal from the second aircraft 120, the computing device(s) 118 can be configured to send a set of data indicative of the distress signal to the one or more control tower(s) 140. The one or more control tower(s) 140 can, for example, be associated with a ground unit that can address one or more distress signal(s) from an aircraft. The control tower(s) 140 can be configured to receive the set of data that is indicative of the distress signal associated with an aircraft. In some implementations, the control tower(s) can be configured to communicate with the second aircraft 120 to address the problems associated with the distress signal.

Figure 2:
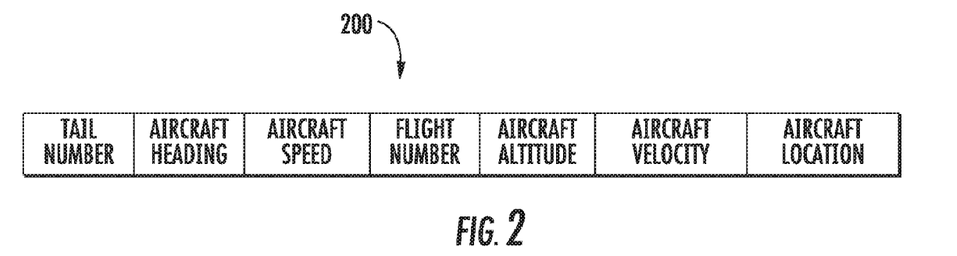
FIG. 2 depicts an example format of a transmission according to example embodiments of the present disclosure.

FIG. 2 depicts an example format of a transmission 200 according to example embodiments of the present disclosure. The transmission 200 can be first initial transmission sent by the second aircraft 120 to the first aircraft 110. The transmission 200 can include a first set of data. As shown in FIG. 2, the first set of data can include, for example, at least one of a tail number associated with the aircraft 120, a heading of the second aircraft 120, a speed of the second aircraft 120, a flight number associated with the second aircraft 120, an altitude of the second aircraft 120, a velocity associated with the second aircraft 120, or a location associated with aircraft 120.

Figure 3:
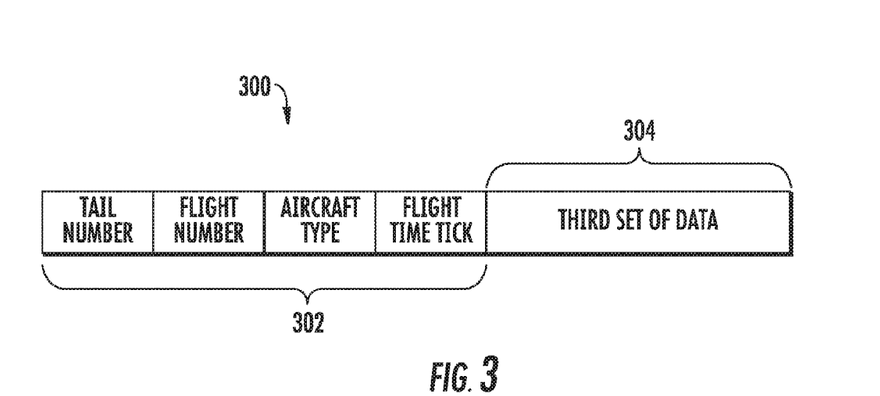
FIG. 3 depicts an example format of another transmission according to example embodiments of the present disclosure.

FIG. 3 depicts an example format of a transmission 300 according to example embodiments of the present disclosure. The transmission 300 can be a transmission sent by the second aircraft 120 that includes a set of data indicative of one or more parameter(s) associated with the second aircraft 120. In some implementations, as shown in FIG. 3, the transmission can include a header segment 302 and a body (or payload) segment 304. The header segment 302 can include, for example, at least one of a tail number associated with the second aircraft 120, a flight number associated with the second aircraft 120, an aircraft-type associated with the second aircraft 120, or a flight time tick associated with the second aircraft 120. The body segment 304 can include the set of data indicative of the one or more parameter(s) associated with the second aircraft 120.

Figure 4:
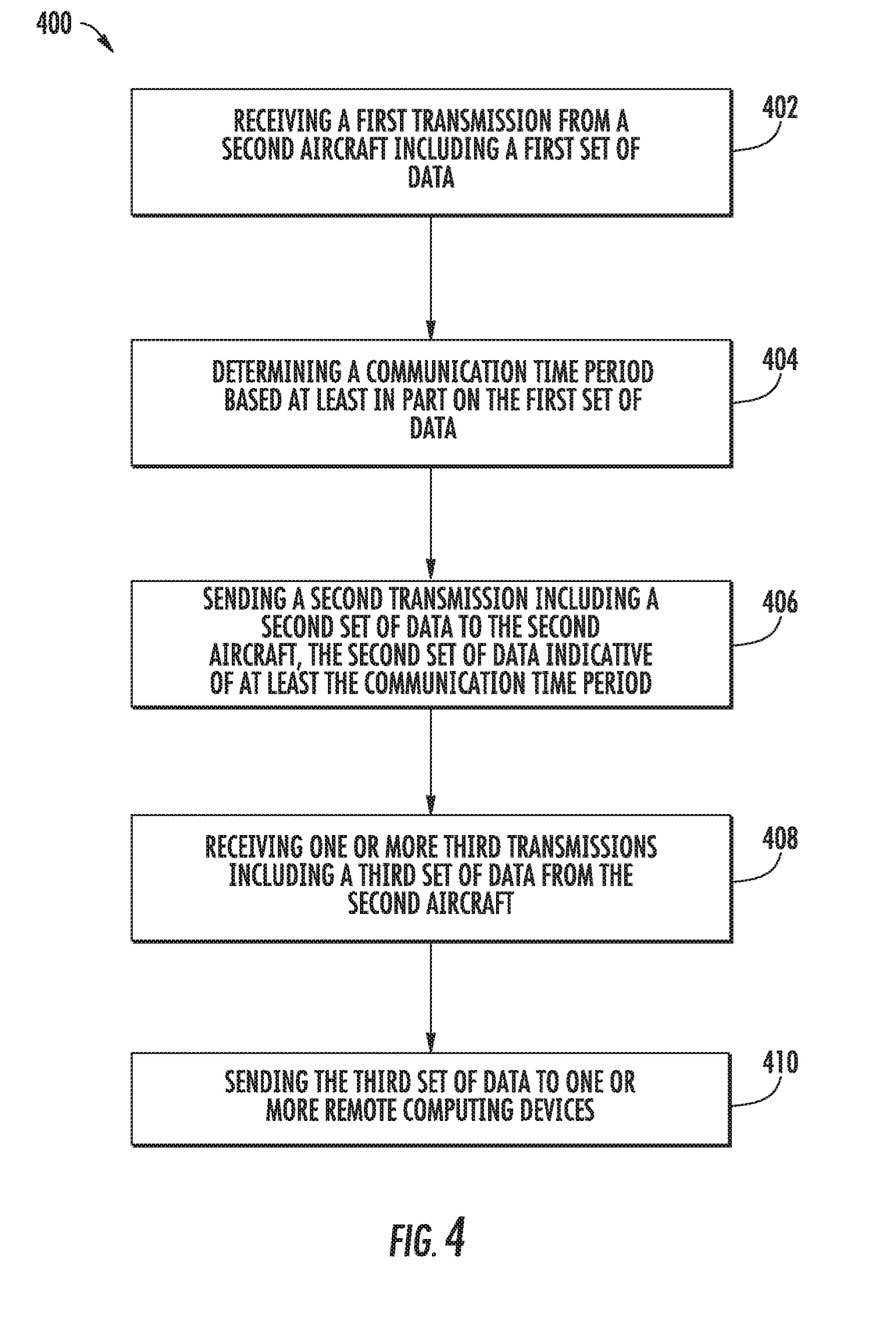
FIG. 4 depicts a flow diagram of an example method for collecting aircraft data according to example embodiments of the present disclosure.

FIG. 4 depicts a flow diagram of an example method 400 for collecting aircraft data according to example embodiments of the present disclosure. FIG. 4 can be implemented by one or more computing device(s), such as the computing device(s) 118 depicted in FIGS. 1 and 6. One or more step(s) of the method 400 can be performed while the first aircraft 110 and the second aircraft 120 are in-flight. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method 400 can include receiving a first transmission from a second aircraft 120 including a first set of data. For instance, the second onboard computing system 126 of the second aircraft 120 can send a first transmission to the computing device(s) 118 of the first aircraft 110. The computing device(s) 118 can receive the first transmission from the second aircraft 120. The first transmission can include a first set of data associated with the second aircraft 120. For example, the first set of data can include at least one of a heading of the second aircraft 120, a speed of the second aircraft 120, a flight number associated with the second aircraft 120, an altitude of the second aircraft 120, a velocity of the second aircraft 120, or a location of the second aircraft 120.

At (404), the method 400 can include determining a communication time period based, at least in part, on the first set of data. For instance, computing device(s) 118 can determine a communication time period during which the first aircraft 110 can receive data sent from the second aircraft 120. The communication time period can be determined based at least in part on the first set of data. Additionally and/or alternatively, the communication time period can be based, at least in part, on a velocity associated with the first aircraft 110, a velocity associated with the second aircraft 120, and/or a distance between the first and second aircrafts 110 and 120.

At (406), the method 400 can include sending a second transmission including a second set of data to the second aircraft, the second set of data being indicative of at least the communication time period. For instance, the computing device(s) 118 can send a second transmission to the second aircraft 120. The second transmission can include a second set of data indicative of at least the communication time period.

The second aircraft 120 can receive (e.g., via the second onboard computing system 126) the second transmission and the second set of data. In response, the onboard computing system 126 can send one or more third transmission(s) including a third set of data to the computing device(s) 118. The third set of data can be indicative of one or more parameter(s) associated with the second aircraft 120. For example, the third set of data can include data indicative of data recorded in a flight recorder of the second aircraft 120. In some implementations, the third set of data can include one or more operating parameter(s) provided to the onboard computing system 126 by the aircraft systems of the second aircraft 120.

The size of the third set of data can be based, at least in part, on the communication time period. For instance, the second onboard computing system 126 can determine how much data the second aircraft 120 can send to the first aircraft 110 within the communication time period, by multiplying the communication time period (e.g., measured in units of time) by a data speed (e.g., bps, kbps, Mbps, Gbps) associated with the communication network. In this way, the second onboard computing system 126 can send a third set of data that can be received by the computing device(s) 116 in its entirety.

At (408), the method 400 can include receiving one or more third transmission(s) including the third set of data from the second aircraft 120. For instance, the one or more computing device(s) 118 can receive one or more third transmission(s) from the second aircraft 120. The one or more third transmission(s) can include a third set of data indicative of one or more parameter(s) associated with the second aircraft 120. As indicated above, a size of the third set of data can be based, at least in part, on the communication time period.

At (410), the method 400 can include sending the third set of data to one or more remote computing device(s) 130. For instance, the computing device(s) 118 can send the third set of data to the remote computing device(s) 130. In some implementations, the computing device(s) 118 can send the third set of data to the remote computing device(s) 130 after the landing of the first aircraft 110.

As indicated above, the remote computing device(s) 130 can be configured to compile data associated with the second aircraft 120. For example, in some implementations, the third set of data can include one or more data fragment(s) and one or more of the remote computing device(s) 130 can be configured to compile the data fragments to create a compiled set of data associated with the second aircraft 120.

Figure 5:
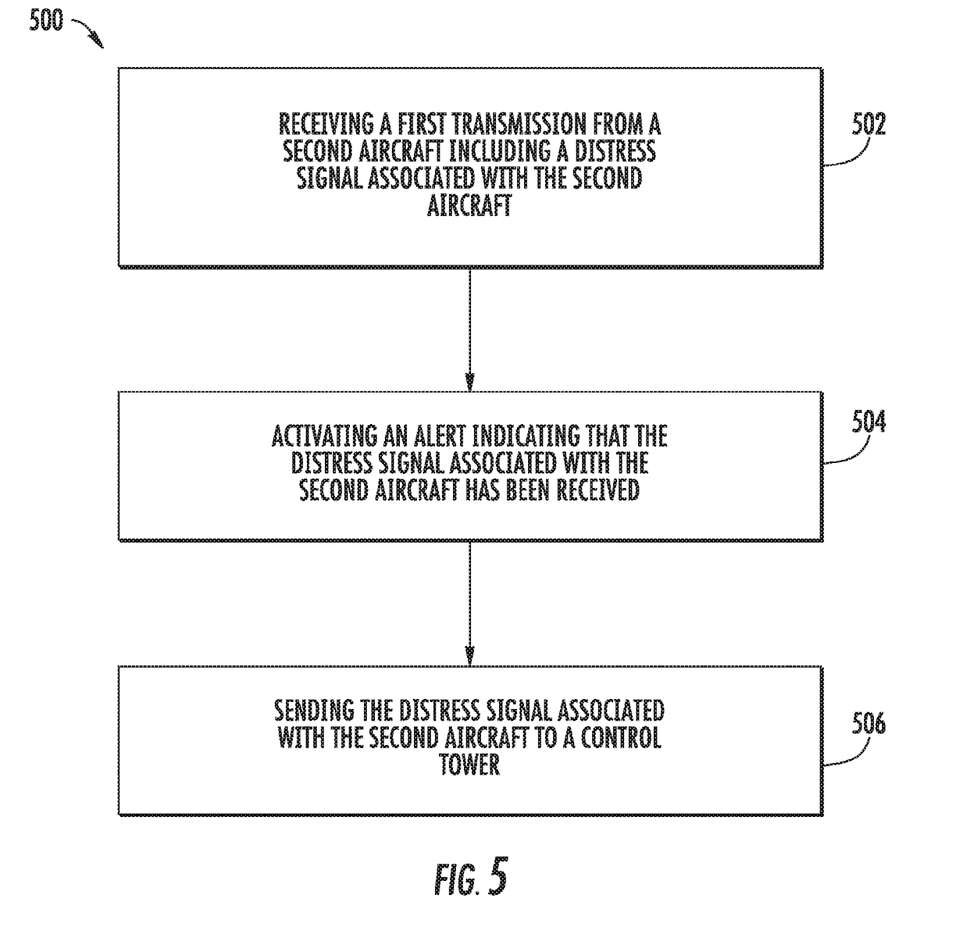
FIG. 5 depicts a flow diagram of an example method for reporting a distress signal according to example embodiments of the present disclosure.

FIG. 5 depicts a flow diagram of an example method 500 for reporting a distress signal according to example embodiments of the present disclosure. FIG. 5 can be implemented by one or more computing device(s), such as the one or more computing device(s) 118 depicted in FIG. 1. One or more step(s) of the method 500 can be performed while the first aircraft 110 and the second aircraft 120 are in-flight. In addition, FIG. 5 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (502), the method 500 can include receiving a first transmission from a second aircraft 120 including a distress signal associated with the second aircraft 120. For instance, the second aircraft 120 can send a first transmission to the computing device(s) 118 of the first aircraft 110. The computing device(s) 118 can receive the first transmission from the second aircraft 120. The first transmission can include a first set of data associated with the second aircraft 120. The first set of data can include an indication of a distress signal associated with the second aircraft 120. The distress signal can indicate, for example, a threat of danger, medical emergency, a request for assistance, degradation in the performance of an aircraft component and/or system, failure of an aircraft component and/or system, etc.

At (504), the method 500 can include activating an alert indicating that the distress signal associated with the second aircraft 120 has been received. For instance, the one or more computing device(s) 118 can activate an alert indicating that the distress signal associated with the second aircraft 120 has been received. For example, in response to receiving the indication of the distress signal, the computing device(s) 118 can communicate with a display system and/or an alert system of the first aircraft 110 to alert the flight crew members of the first aircraft 110 of the distress signal.

Additionally and/or alternatively, at (506), method 500 can include sending the distress signal associated with the second aircraft 120 to a control tower. For instance, the one or more computing device(s) 118 can send a fourth set of data to the control tower(s) 140. The fourth set of data can be indicative of the distress signal associated with the second aircraft 120. The control tower(s) 140 can receive the fourth set of data and take action to address the problems of the second aircraft 120.

Figure 6:
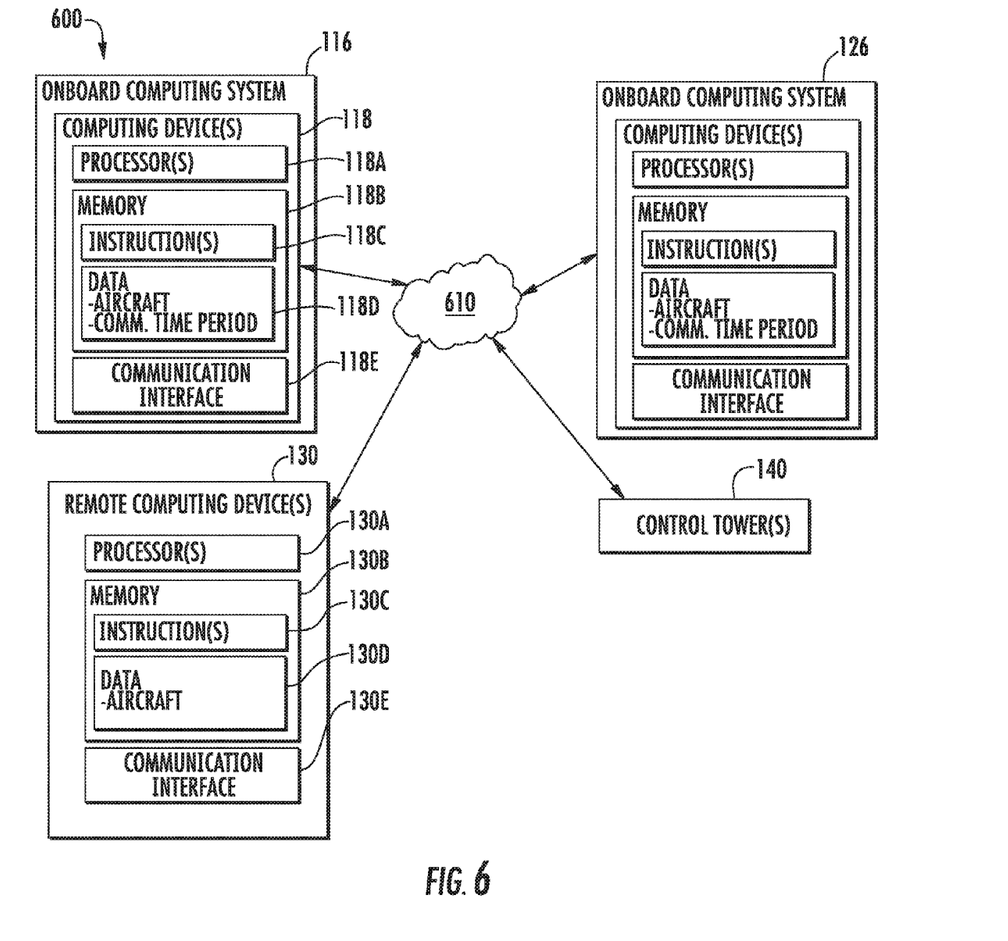
FIG. 6 depicts an example system according to example embodiments of the present disclosure.

FIG. 6 depicts an example system 600 according to example embodiments of the present disclosure. The system 600 can include the first onboard computing system 116, the second onboard computing device 126, the remote computing device(s) 130, and/or the control tower(s) 140. The first onboard computing system 116, the second onboard computing device 126, the remote computing device(s) 130, and/or the control tower(s) 140 can be configured to communicate via a network 610, such as, a very high frequency (VHF) network, high frequency (HF) network, SATCOM network, WiFi, network and/or any other suitable communication networks.

As shown, the computing device(s) 118 can include one or more processor(s) 118A and one or more memory device(s) 118B. The one or more processor(s) 118A can include any suitable processing device, such as a microprocessor, microcontroller, integrated circuit, logic device, or other suitable processing device. The one or more memory device(s) 118B can include one or more computer-readable media, including, but not limited to, non-transitory computer-readable media, RAM, ROM, hard drives, flash drives, or other memory devices.

The one or more memory device(s) 118B can store information accessible by the one or more processor(s) 118A, including computer-readable instructions 118C that can be executed by the one or more processor(s) 118A. The instructions 118C can be any set of instructions that when executed by the one or more processor(s) 118A, cause the one or more processor(s) 118A to perform operations. The instructions 118C can be software written in any suitable programming language or can be implemented in hardware.

In some embodiments, the instructions 118C can be executed by the one or more processor(s) 118A to cause the one or more processor(s) 118A to perform operations, such as the operations for collecting aircraft data as described with reference to FIG. 4, reporting a distress signal as described with reference to FIG. 5, and/or any other operations or functions of the one or more computing device(s) 118.

The memory device(s) 118B can further store data 118D that can be accessed by the processor(s) 118A. The data 118D can include, for instance, data associated with the first and/or second aircraft 110 and/or 120. For example, the data 118D can include one or more parameter(s) associated with the second aircraft, data that is the same as or similar to the data stored in the flight recorder of the second aircraft 120, and/or any other data associated with the second aircraft 120 and received by the computing device(s) 118. The data 118D can include similar such data associated with the first aircraft 110. The data 118D can further include data associated with a communication time period such as, for example, speeds associated with each of the first and second aircrafts 110 and 120, headings associated with each of the first and second aircrafts 110 and 120, flight numbers associated with each of the first and second aircrafts 110 and 120, altitudes associated with each of the first and second aircrafts 110 and 120, locations associated with each of the first and second aircrafts 110 and 120, a distance between the first and second aircrafts 110 and 120, etc.

The computing device(s) 118 can also include a network interface 118E used to communicate, for example, with the other components of system 600 over network 610. The network interface can include any suitable components for interfacing with one more network(s), including for example, transmitters, receivers, ports, controllers, antennas, or other suitable components.

As shown, the second onboard computing system 126 of the second aircraft 120 can include similar components to those as described above with respect to the first onboard computing system 116.

The remote computing device(s) 130 can include one or more processor(s) 130A and one or more memory device(s) 130B. The one or more processor(s) 130A can include any suitable processing device, such as a microprocessor, microcontroller, integrated circuit, logic device, or other suitable processing device. The one or more memory device(s) 130B can include one or more computer-readable media, including, but not limited to, non-transitory computer-readable media, RAM, ROM, hard drives, flash drives, or other memory devices.

The one or more memory device(s) 130B can store information accessible by the one or more processor(s) 130A, including computer-readable instructions 130C that can be executed by the one or more processor(s) 130A. The instructions 130C can be any set of instructions that when executed by the one or more processor(s) 130A, cause the one or more processor(s) 130A to perform operations. The instructions 130C can be software written in any suitable programming language or can be implemented in hardware. In some embodiments, the instructions 130C can be executed by the one or more processor(s) 130A to cause the one or more processor(s) 130A to perform operations, such as those of the remote computing device(s) 130 described herein.

The memory device(s) 130B can further store data 130D that can be accessed by the processor(s) 130A. The data 130D can include, for instance, data associated with the second aircraft 120. For example, the data 130D can include one or more parameter(s) associated with the second aircraft, data that is the same as or similar to the data stored in the flight recorder of the second aircraft 120, data fragments associated with the second aircraft 120, compiled sets of data associated with the second aircraft 120 and/or any other data associated with the second aircraft 120, and received by the remote computing device(s) 130.

The remote computing device(s) 130 can also include a network interface 130E used to communicate, for example, with the first aircraft 120 over a communication network 610. The network interface can include any suitable components for interfacing with one more networks, including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The technology discussed herein makes reference to computer-based systems, as well as, actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of collecting aircraft data, comprising:

receiving, by one or more computing devices located on a first aircraft, a first transmission from a second aircraft, wherein the first transmission comprises a first set of data associated with the second aircraft;

determining, by the one or more computing devices, a communication time period during which the first aircraft can receive data sent from the second aircraft, wherein the communication time period is determined based at least in part on the first set of data, a velocity associated with the first aircraft, a velocity associated with the second aircraft, and a distance between the first and second aircrafts;

sending, by the one or more computing devices, a second transmission to the second aircraft, wherein the second transmission comprises a second set of data indicative of at least the communication time period; and receiving, by the one or more computing devices, one or more third transmissions from the second aircraft, wherein the one or more third transmissions comprise a third set of data indicative of one or more parameters associated with the second aircraft, and wherein a size of the third set of data is based at least in part on the communication time period.

2. The computer-implemented method of claim 1, wherein the first set of data comprises an indication of a distress signal associated with the second aircraft.

3. The computer-implemented method of claim 2, further comprising:
activating, by the one or more computing devices, an alert indicating that the distress signal associated with the second aircraft has been received.

4. The computer-implemented method of claim 2, further comprising:
sending, by the one or more computing devices, a fourth set of data to a control tower, wherein the fourth set of data is indicative of the distress signal associated with the second aircraft.

5. The computer-implemented method of claim 1, further comprising:
sending, by the one or more computing devices, the third set of data to one or more remote computing devices, wherein one or more of the remote computing devices are configured to compile data associated with the second aircraft.

6. The computer-implemented method of claim 5, wherein the third set of data comprises one or more data fragments, and wherein one or more of the remote computing devices are configured to compile the data fragments to create a compiled set of data associated with the second aircraft.

7. The computer-implemented method of claim 1, wherein the first set of data comprises at least one of a heading of the second aircraft, a speed of the second aircraft, a flight number associated with the second aircraft, or an altitude of the second aircraft.

8. The computer-implemented method of claim 1, wherein each of the one or more third transmissions include a header segment and a body segment.

9. The computer-implemented method of claim 8, wherein the header segment comprises at least one of a flight number associated with the second aircraft, an aircraft-type associated with the second aircraft, a tail number associated with the second aircraft, or a flight time tick associated with the second aircraft, and wherein the body segment comprises the third set of data.

10. The computer-implemented method of claim 1, wherein the first aircraft and the second aircraft are in-flight.

11. The computer-implemented method of claim 1, wherein the third set of data comprises data indicative of data recorded in a flight recorder of the second aircraft.

12. An avionics system for collecting aircraft data, the avionics system comprising one or more processors and one or more memory devices included with a first aircraft, the one or more memory devices storing instructions that when executed by the one or more processors cause the one or more processors to perform operations, the operations comprising:
receiving a first transmission from a second aircraft, the first transmission comprising a first set of data associated with the second aircraft;
receiving one or more second transmissions from the second aircraft, the second transmissions comprising a second set of data indicative of one or more parameters associated with the second aircraft,
wherein a size of the second set of data is based at least in part on a communication time period during which the first aircraft is able to receive the one or more second transmissions from the second aircraft, and
wherein the communication time period is based at least in part on the first set of data, a velocity associated with the first aircraft, a velocity associated with the second aircraft, and a distance between the first and second aircrafts.

13. The avionics system of claim 12, wherein the operations further comprise:
determining the communication time period during which the first aircraft is able to receive the one or more second transmissions from the second aircraft.

14. The avionics system of claim 13, wherein the operations further comprise:
sending a responsive transmission to the second aircraft, wherein the responsive transmission comprises an indication of the communication time period.

15. The avionics system of claim 12, wherein the first set of data comprises an indication of a distress signal associated with the second aircraft.

16. The avionics system of claim 12, wherein the operations further comprise:
sending the second set of data to one or more remote computing devices, wherein at least one of the remote computing devices is configured to compile data associated with the second aircraft.

17. An aircraft, comprising:
an engine;
a fuselage; and
a computing system comprising one or more processors and one or more memory devices located on the aircraft, the one or more memory devices storing instructions that when executed by the one or more processors cause the one or more processors to perform operations comprising
receiving, from another aircraft, a first transmission comprising a first set of data associated with a velocity and a location of the other aircraft; and
receiving, from the other aircraft, one or more second transmissions comprising a second set of data indicative of one or more parameters associated with the other aircraft,
wherein a size of the second set of data is based at least in part on a communication time period indicative of a time period during which the aircraft can receive the one or more second transmissions from the other aircraft,
wherein the communication time period is based at least in part on the first set of data of the first transmission, a velocity associated with the first aircraft, a velocity associated with the second aircraft, and a distance between the first and second aircrafts.

18. The aircraft of claim 17, wherein the operations further comprise:
   determining the communication time period based at least in part on the first set of data; and
   sending, to one or more remote computing devices, the second set of data, wherein at least one of the remote computing devices is configured to compile data associated with the second aircraft.

* * * * *